United States Patent [19]

Fisher

[11] 4,131,375
[45] Dec. 26, 1978

[54] SPLINED JOINTS

[75] Inventor: Leslie G. Fisher, Birmingham, England

[73] Assignee: Guest, Keen & Nettlefolds, Limited, Warley, England

[21] Appl. No.: 829,150

[22] Filed: Aug. 30, 1977

[30] Foreign Application Priority Data

Sep. 4, 1976 [GB] United Kingdom ............... 36748/76

[51] Int. Cl.² ............................................. F16D 1/06
[52] U.S. Cl. .................................... 403/13; 403/359; 29/432
[58] Field of Search ................... 403/359, 298, 13, 14, 403/372, 371; 64/23; 29/432, 525

[56] References Cited

U.S. PATENT DOCUMENTS

| 3,197,216 | 7/1965 | Jackson | 403/359 X |
| 3,374,015 | 3/1968 | Gies | 403/359 |
| 3,508,418 | 4/1970 | Jones | 403/359 X |

FOREIGN PATENT DOCUMENTS 1203245  8/1970  United Kingdom ...................... 403/13

Primary Examiner—Andrew V. Kundrat
Attorney, Agent, or Firm—Roger W. Erickson

[57] ABSTRACT

A splined joint between a shaft and a muff, for the purpose of preventing "dog legging", has a chamber provided at the end of the muff from which the shaft projects and a guide ring received in such chamber, the guide ring exerting constraint upon relative radial movement between the shaft and muff. The required clearance between shaft and guide ring may be obtained by providing projections within the chamber and shearing material from projections on the guide ring by rotating the guide ring relative to the muff.

4 Claims, 9 Drawing Figures

FIG.1

SPLINED JOINTS

BACKGROUND TO THE INVENTION

Field of the Invention

This invention relates to splined joints between rotary members, one of which is a male member (herein called the shaft) and has a plurality of axially extending radially outwardly projecting teeth spaced apart angularly about the rotational axis of the shaft, and the other of which is a female member (herein call the muff) and has a plurality of axially extending radially inwardly projecting teeth spaced apart angularly about the rotational axis of the muff, the teeth of each of these members fitting in the grooves between the teeth of the other of these members as a close sliding fit to permit of relative axial sliding movement between the members whilst torque is transmitted between them.

Such joints are hereinafter called splined joints of the kind specified.

One of the problems encountered in splined joints of the kind specified is known as "dog legging". This means that, instead of being in axial alignment, the rotary axes of the shaft and muff take up an oblique relation due to clearances which exist initially or develop due to wear and tear between the teeth of one member and the grooves of the other.

SUMMARY OF THE INVENTION

The object of the present invention is to overcome or mitigate this disadvantage.

According to one aspcet of the invention the muff has an internal chamber adjacent to the end from which the shaft projects and a guide ring is provided in said chamber of dimensions to exert constraint upon relative radial movement between the shaft and the muff.

For exerting the radial constraint, the chamber in the muff may be provided with a plurality of angularly spaced inwardly extending projections which engage the outer surface of the guide ring. These projections may be aligned with respective teeth of the muff but may be dimensioned to project radially to a smaller extent than the teeth of the muff, and the guide ring may have radially outwardly extending projections which can engage in the grooves left between the projections of the muff when the guide ring is assembled into said chamber, the guide ring being made of a material which can be ruptured, e.g. by shearing, in response to rotation of the ring relatively to the muff so that the inner faces of the projections of the muff are brought into contact with newly exposed circumferential face portions of the ring produced by shearing or other rupture of said projections upon rotation of the ring.

This ensures close engagement between the parts of the chamber, i.e. the projections which produce radial constraint, and the surface of the ring irrespective of dimensional tolerances of both these components.

The chamber and the guide ring may be provided with respective formations which cooperate to prevent axial displacement or removal of the guide ring from the open end of the chamber. The formations on the chamber may comprise the radially inwardly extending projections aforementioned which, in this case, extend for part only of the axial length of the chamber from its outer end leaving an annular space at its inner end with an internal radius at least equal to the radial dimensions of the projections on the guide ring.

With this arrangement, after rotation of the guide ring to effect disruption or shearing of the portions of its projections overlapped axially with the projections of the chamber, the remainder, namely the unruptured or unsevered portions of the projections on the guide ring move angularly to be positioned behind the projections of the chamber and into axially abutting relation therewith to prevent axial displacement or removal of the guide ring.

The inward projections of the chamber may conveniently be portions of the teeth at the mouth which are cut away radially to present a reduced radial depth.

The guide ring may be made of a non-metallic material selected to provide the necessary strength to furnish the radial constraint aforesaid whilst being capable of being ruptured or sheared by the projections in the chamber as aforesaid.

According to a further aspect the invention resides in a method of reducing "dog legging" in a splined joint of the kind specified comprising providing a chamber at the end of the muff from which the shaft projects, said chamber having angularly spaced radially inwardly extending projections, providing a guide ring of rupturable material but of mechanical strength sufficient to exercise constraint upon relative radial movement between the shaft and the muff, said guide ring having angularly spaced radially outwardly extending projections of dimensions and spacing such as to be capable of passing into the grooves or spaces between the projections of said chamber, inserting said guide ring into said chamber with its projections in said grooves or spaces, and rotating said guide ring through an angular displacement such that its projections are sheared or otherwise removed from the remainder of the ring by the inwardly projecting formations of the chamber.

Preferably, as will be evident from the foregoing description of the structure of the joint, the inwardly projecting formations of the chamber extend for part only of the axial length of the chamber from its outer end, while the projections of the guide ring extend for the full length thereof so that after said rotation portions of the axial projections of the guide ring are left integrally connected with the remainder of the guide ring and lie axially beyond the projections of the chamber and in axially abutting relation therewith.

A further feature of the method is that, if desired, shim means may be provided temporarily between the shaft and the inner circumferential face of the guide ring, such shim means being disabled or withdrawn after said rotation to provide a control clearance space for controlled radial pressure of the guide ring on the shaft.

BRIEF DESCRIPTION OF DRAWINGS

The invention will now be described, by way of example, with reference to the accompanying drawings wherein.

DESCRIPTION OF PREFERRED EMBODIMENT

Figure 1:
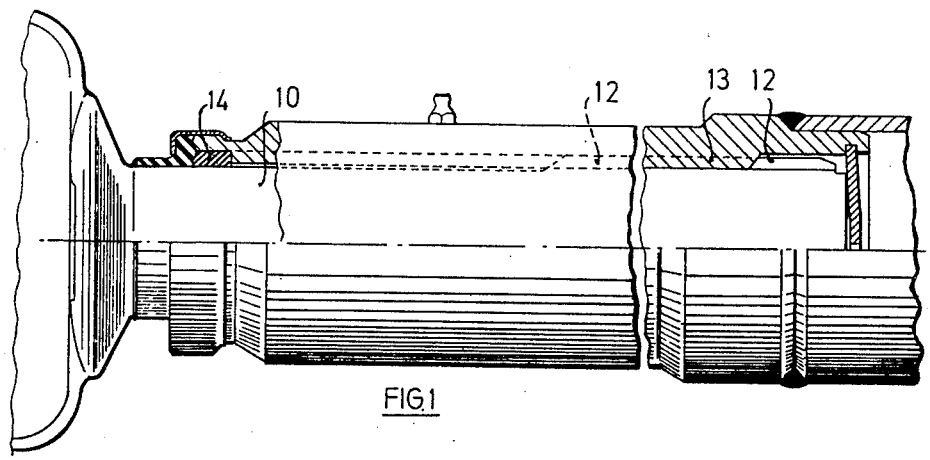
FIG. 1 is a view in side elevation and partly in diametral cross-section of one embodiment of spline joint of the kind specified in accordance with the invention.
Figure 2:
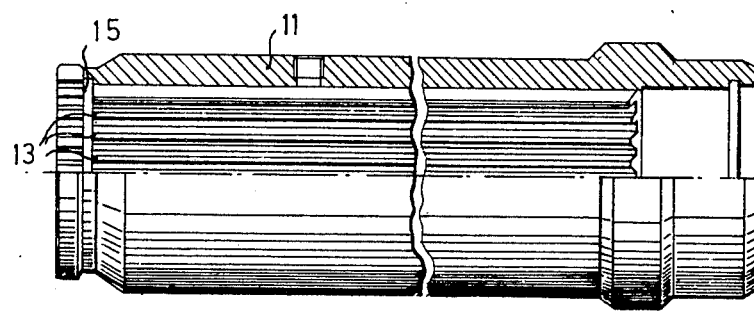
FIG. 2 is a view in diametral cross-section of the muff of FIG. 1.

The joint illustrated in FIG. 1 includes a male member or shaft 10 and a female member or muff 11, the former having radially outwardly projecting axially extending and angularly spaced teeth 12 which define grooves between them, and the latter having radially inwardly projecting axially extending and angularly spaced teeth 13 which define grooves between them, the dimensions of the teeth in resulting grooves being such that the members 10 and 11 are a close sliding fit.

Nevertheless, due to dimensional tolerances and due to wear and tear, the axes of the members 10 and 11 may, instead of being axially aligned with each other, have an oblique relation of a few degrees, this phenomenon being known as "dog legging".

Figure 4:
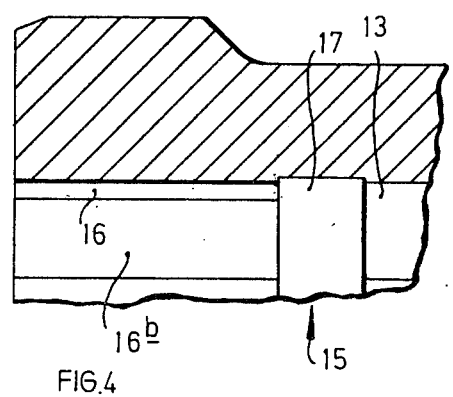
FIG. 4 is a fragmentary view on an enlarged scale of the detail indicated at B in FIG. 2.
Figure 5:
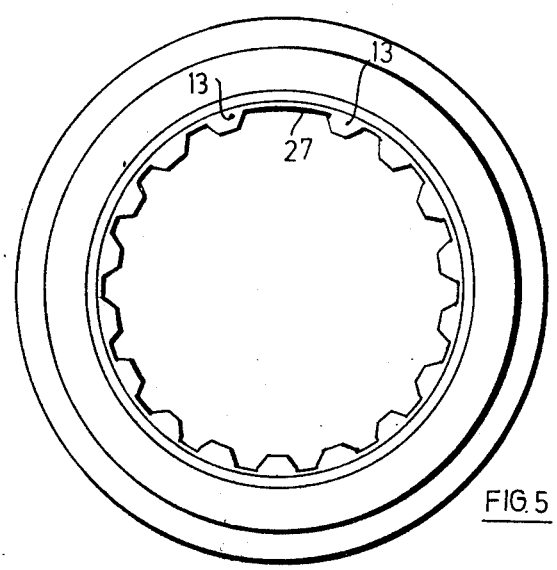
FIG. 5 is a view in end elevation of the muff seen in FIG. 2.

To reduce the angular deviation between these axes, the joint incorporates a guide ring 14 which is received in an internal chamber 15 best seen in FIG. 4, formed in the end of the muff from which the shaft projects. It will be understood that in use axial movement between the shaft 10 and the muff 11 can take place and the teeth 12 of the shaft are shorter than those 13 of the muff to provide freedom for such movement.

The chamber 15 is formed internally with a plurality of inwardly extending projections 16 which conveniently comprise root portions of the teeth 13 of the muff and are produced by counterboring the end of the muff after the operation of forming the teeth 13.

Figure 3:
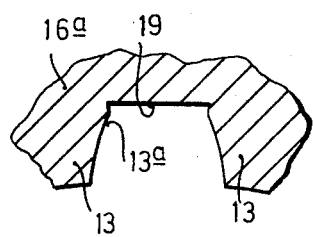
FIG. 3 is a fragmentary view in transverse cross-section through the muff showing the cross-sectional shape of the grooves between adjacent teeth.

Thus, as seen in FIG. 3, the full teeth 13 are counterbored to a depth coincident with the discontinuity 13a so that the portions 16a remain in the chamber to form the projections 16. The latter extend for part only of the axial length of the chamber leaving a portion 17 of the latter at the inner end of the chamber, i.e. between the teeth 13 and the ends of the projections 16, free from any radial inward projection.

Both the shaft and the muff are made of a suitable metal such as steel of a composition capable of being hardened, and subjected to hardening treatment to provide the necessary wearing qualities for the cooperative teeth and grooves of the splined joint.

The guide ring on the other hand is made from a rupturable material yet one which provides the necessary mechanical strength to be capable of exerting radial constraint preventing or reducing "dog legging".

One suitable material for this purpose is nylon 6 but other plastics material having the required mechanical properties can be utilised.

Figure 6:
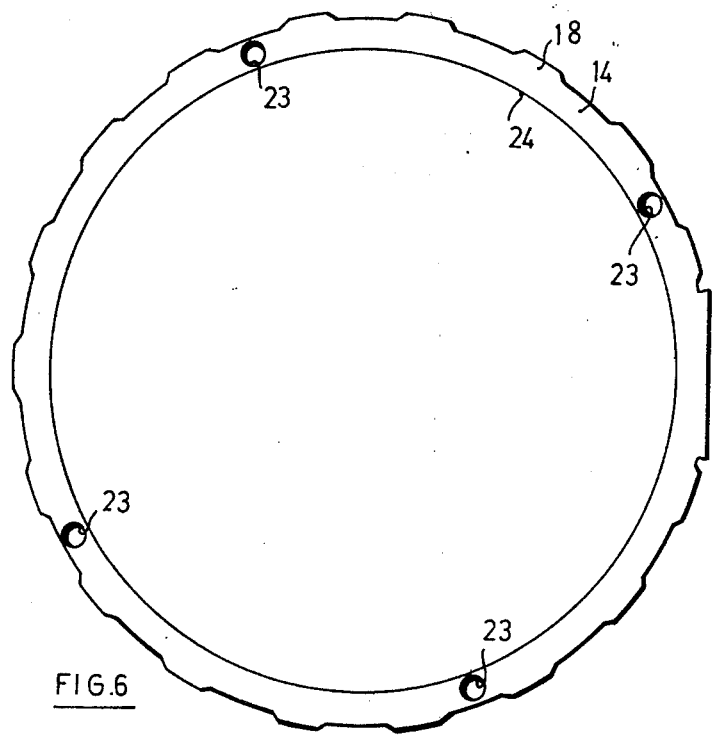
FIG. 6 is a view in end elevation and on an enlarged scale of the guide ring of the joint.
Figure 7:
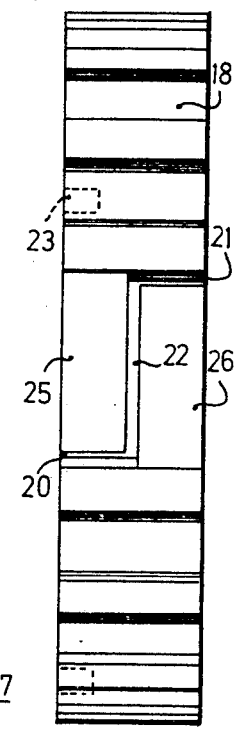
FIG. 7 is a view in side elevation of the guide ring.

One embodiment of guide ring is seen in FIGS. 6 and 7 and is of generally annular form having a plain inner surface 24 and a plurality of radially outwardly extending projections 18 at its outer face of dimensions and spacing corresponding to the grooves 19 (FIG. 3) afforded between inwardly extending projections 16 of the chamber. The radial dimensions of the projections 18 need not have the full depth of the grooves 19 since their purpose is merely to provide a quantity of rupturable, e.g. shearable, material which, after shearing, will present a radially outwardly facing surface which is fully in contact with the inwardly presented faces of the projections 16. The projections 18, however, extend for the full axial length of the ring (although they need not do so provided, after assembly, part of each projection 18 overlaps axially with the teeth 16 and part is received in the enlargement 17).

The guide ring may be gapped at a position along its circumference and in the embodiment shown the gap includes two legs 20 and 21 extending axially on opposite ends of the ring at circumferentially offset positions and a connecting leg 22.

Suitable formations are provided on the guide ring to enable it to be rotated about its own axis and these may conveniently be in the form of sockets 23 opening into its outer end face.

The ring is inserted into the chamber 15 from the open end thereof between the shaft and the muff and with the projections 18 passing to the grooves 16b between projections 16.

Thereafter the guide ring is rotated, preferably through an angular distance to bring the unsheared portion of each projection in the enlargement 17 to axial alignment with a respective one of the projections 16 against which it abuts, axially preventing withdrawal of the guide ring from the chamber.

During this operation, and if the dimension of the guide ring admits, a shim in the form of a thin sleeve of either metallic or non-metallic material may be inserted between the inner face 24 of the guide ring and the shaft. The material if non-metallic may be selected to become disrupted or otherwise removed during the course of operation leaving a predetermined clearance between the shaft and the guide ring. If formed of metal it may simply be removed after the operation of installing the ring.

At opposite boundaries of the gap 20, 21, 22 the ring presents end tags 25, 26, the outer faces of which are planar and are tangential to the adjacent outer surface of the ring to which the tags are connected.

At one position around the circumference one tooth 13 of the muff is omitted leaving a double width groove 27 which is matched by a double width groove in the chamber 17 to facilitate axial entry of the end tag portions 25, 26.

Figure 8:
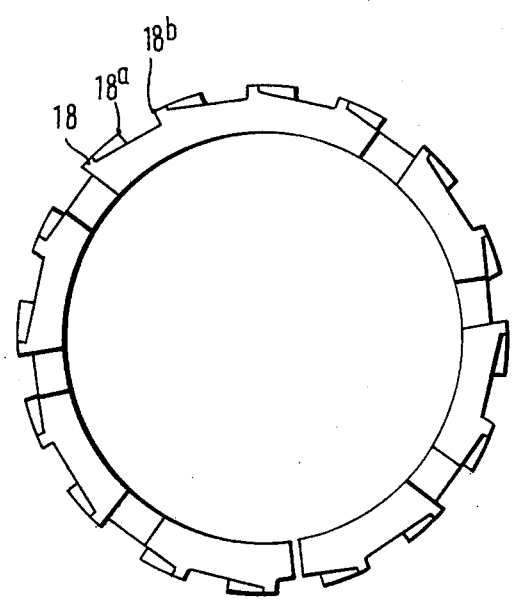
FIG. 8 is a view similar to FIG. 6 of an alternative embodiment of guide ring.
Figure 9:
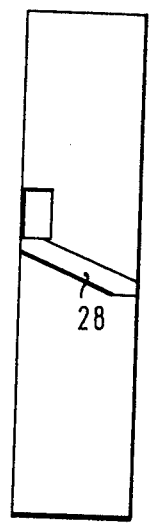
FIG. 9 is a view in side elevation of the guide ring of FIG. 8.

An alternative embodiment of guide ring is seen in FIGS. 8 and 9.

In this embodiment parts corresponding to those previously described are designated by like references and reference will be made only to the differences.

In this embodiment one flank of each projection 18, as seen at 18a, is cut away obliquely (for ease of shearing of the projection 18 upon rotation of the guide ring). The bases of the grooves between adjacent projections 18 are also cut away so that the groove is deeper adjacent to the uncut away flank 18b of each tooth, such base being in a plane tangential to a pitch circle at this position.

The gap of the ring is formed by a simple slot 28 which is oblique to the axis.

I claim:

1. A splined joint between a shaft having a plurality of axially extending radially outwardly projecting teeth spaced apart angularly about the rotational axis of the shaft and a muff having a plurality of axially extending radially inwardly projecting teeth spaced apart angularly about the rotational axis of the muff, the teeth of each member fitting between the teeth of the other member to permit relative axial sliding movement and torque transmission between the members, the improvement wherein:
   a. said muff defines an internal chamber adjacent to its end from which the shaft projects,
   b. a guide ring is disposed in said chamber, the guide ring being of dimensions to exert constraint upon relative radial movement between the shaft and muff,
   c. said chamber in the muff is provided with a plurality of angularly spaced radially inwardly extending projections which engage the outer surface of the guide ring,
   d. said projections are aligned with respective teeth of the muff but project radially inwardly to a smaller extent than the teeth of the muff,
   e. said guide ring having radially outwardly extending projections for engaging in the grooves left between the projections of the muff when the guide ring is first introduced into said chamber,
   f. said guide ring is made of a material which can be sheared in response to rotation of the ring relative to the muff so that the inner faces of the projections of the muff are brought into contact with newly exposed circumferential face portions of the ring produced by the said shearing of the projections upon rotation of the ring, and
   g. said chamber and guide ring are provided with respective formations which cooperate to prevent axial displacement of the guide ring from the open end of the chamber.

2. A splined joint according to claim 1 wherein said formations in the chamber comprise said radially inwardly extending projections, which projections extend for part only of the axial length of the chamber from its outer end leaving an annular space at the inner end of the chamber, such annular space having an internal radius at least equal to the radial dimensions of the projections on the guide ring.

3. A method of reducing "dog legging" in a splined joint between a shaft and a muff, comprising providing a chamber at the end of the muff from which the shaft projects, said chamber having angularly spaced radially inwardly extending projections, providing a guide ring of rupturable material but of mechanical strength sufficient to exercise constraint upon relative radial movement between the shaft and the muff, said guide ring having angularly spaced radially outwardly extending projections of dimensions and spacing such as to be capable of passing into the grooves between the projections of the chamber, inserting said guide ring into said chamber with its projections in said grooves, and rotating said guide ring through an angular displacement to shear its projections from the remainder of the ring by the inwardly projecting formations of the chamber.

4. A method according to claim 3 further comprising introducing shim means temporarily between the shaft and inner circumferential face of the guide ring, and withdrawing such shim means after said rotation of the guide ring to provide a control clearance space between the guide ring and shaft.

* * * * *